May 3, 1938. W. F. WINTERLING 2,116,458
SOLDERING APPARATUS
Filed July 23, 1936 2 Sheets-Sheet 1
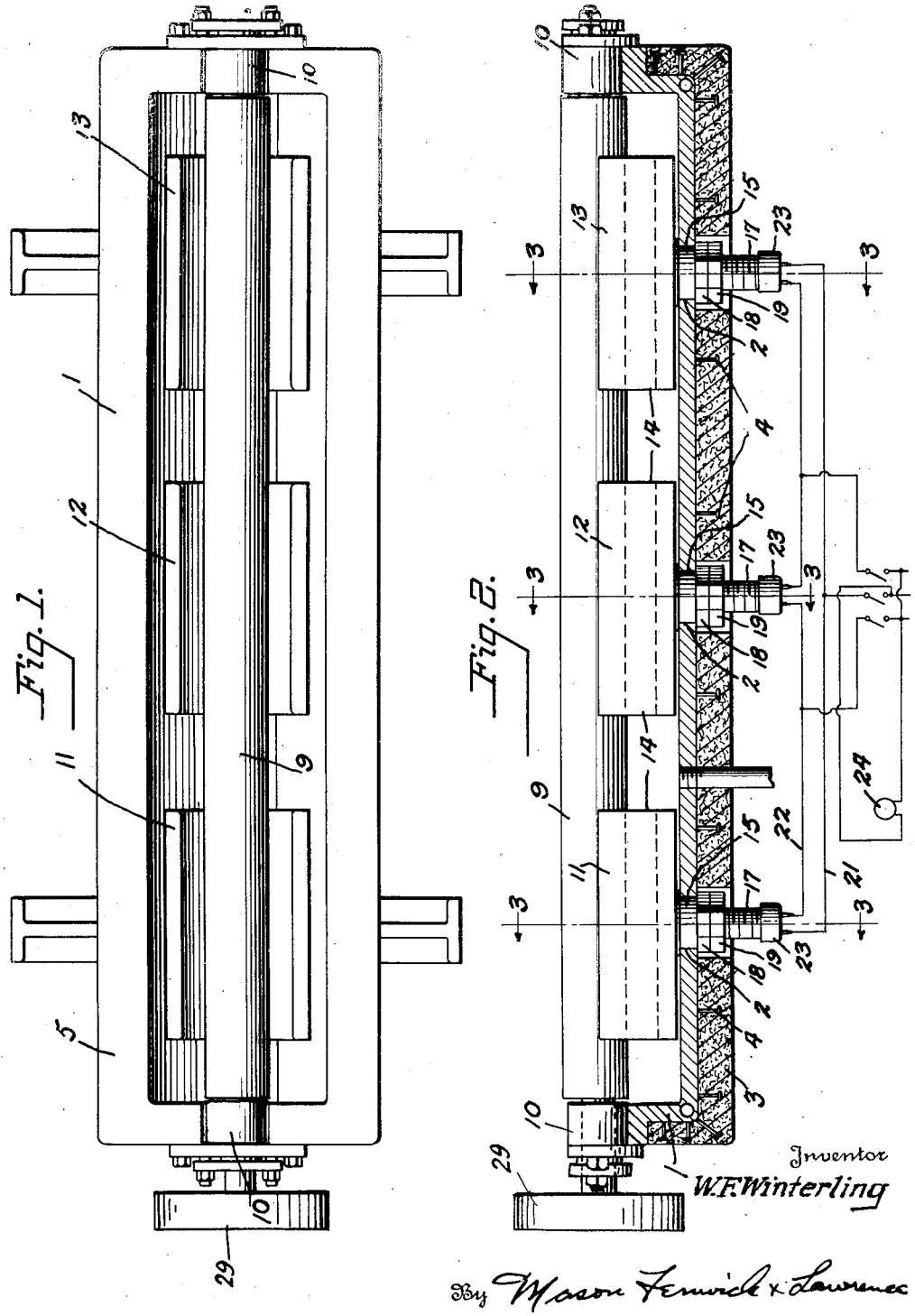
Inventor
W.F.Winterling
By Mason Fenwick & Lawrence
Attorneys May 3, 1938.  W. F. WINTERLING  2,116,458
SOLDERING APPARATUS
Filed July 23, 1936  2 Sheets-Sheet 2
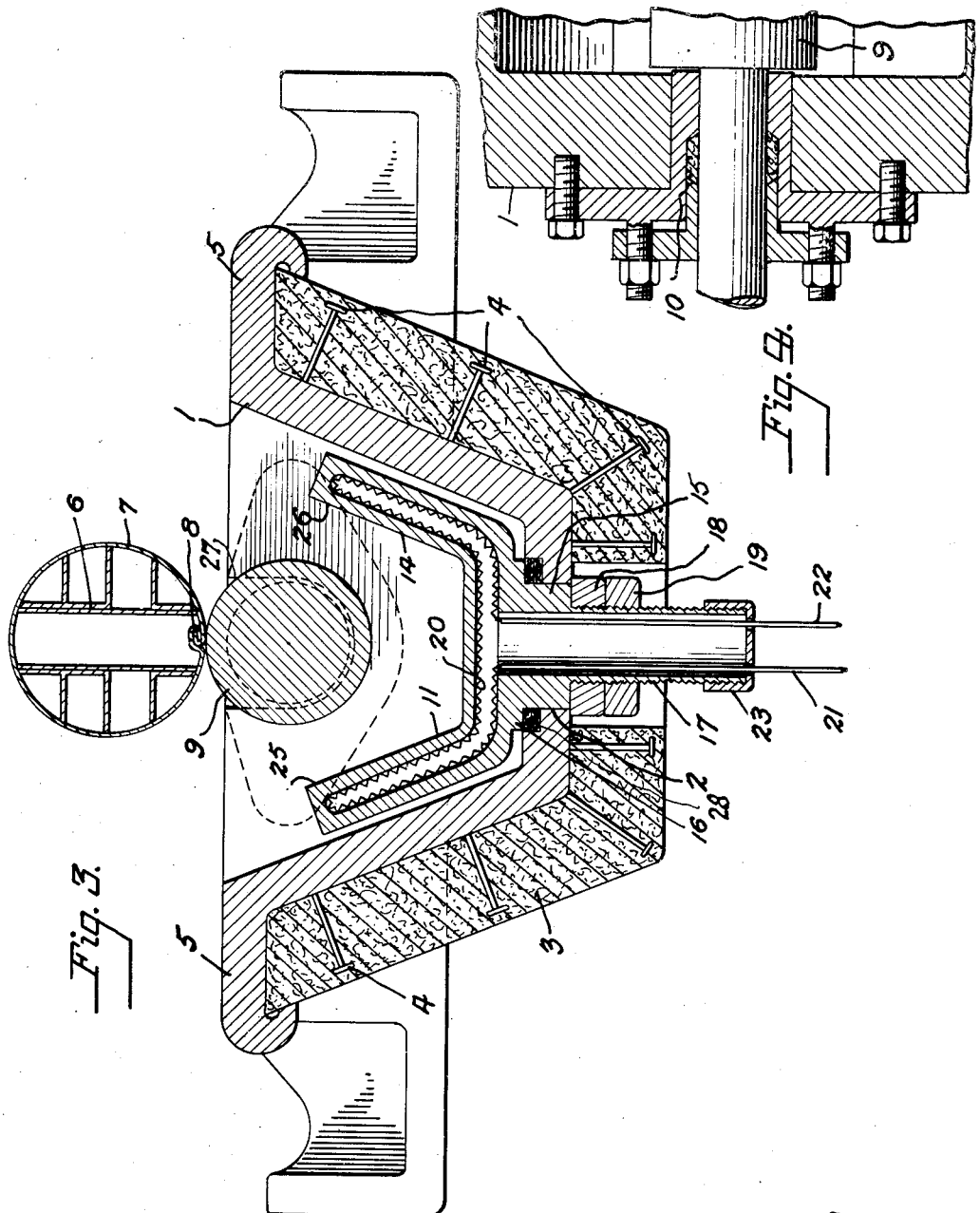
Inventor
W. F. Winterling
By Mason Fenwick & Lawrence
Attorneys Patented May 3, 1938

2,116,458

UNITED STATES PATENT OFFICE 2,116,458

SOLDERING APPARATUS

William F. Winterling, Cambridge, Md., assignor to Phillips Packing Company, Inc., Cambridge, Md., a corporation of Maryland Application July 23, 1936, Serial No. 92,196

6 Claims. (Cl. 113—61)

This invention relates to soldering baths adjunctive to can making machinery, for closing the longitudinal seams in cans.

Soldering baths are of course old, most of them being heated by a hydrocarbon flame. One or two have been devised, heated electrically, a method of heating which has the advantage of exercising a close control over the temperature of the solder, but due to the more local nature of the heat from an electric source, a problem arises in connection with the heating of the solder bath which it is the purpose and function of the present invention to solve.

In the progress of their manufacture, the cans come, suitably guided, in an endless succession, over the solder bath with the seams to be closed on the lower side, where they are contacted by a rotating roller mounted partially immersed in the molten solder, the roller lifting the solder from the bath and wiping it upon the seam. Where gas or oil burners constitute the source of heat, there is generally ample heat to keep the solder at proper temperature during the period of transfer from the bath to the can, but with electric heating it is different; without special provisions the solder upon the roller will cool to such an extent as to impair the perfection of the seam. Those who have experimented with electrically heated solder baths have found it necessary either to conserve the heat by immersing the heating element in the solder or by providing for the heating of the roller, an expedient which adds complication and costliness to the process.

One of the objects of the present invention is to provide a soldering bath in which the heating elements are spaced from the walls of the container so as to be surrounded by the solder so that all the heat will go into the solder and so constructed and disposed as to partially surround the roller in spaced relationship thereto whereby to maintain a body of molten solder in contact with the roller at a higher temperature than the main body of solder in the soldering tank.

Another object of the invention is to provide for the ready and independent removal and replacement of any one of the units which may from time to time require attention.

Other objects of the invention will appear as the following description of a preferred and practical embodiment thereof proceeds.

In the drawings which accompany and form a part of the following specification and throughout the several figures of which the same characters of reference have been used to denote identical parts:

Figure 1 is a plan view of a solder bath embodying the novel features of my invention;

Figure 2 is a vertical longitudinal section;

Figure 3 is a cross section taken along any one of the lines 3—3 of Figure 2; and Figure 4 is a horizontal section through the bearing at one end of the roller.

Referring now in detail to the several figures, the numeral 1 represents in general the solder tank which is trough-shaped and preferably flaring in cross section as shown in Figure 3. The bottom is provided with apertures 2 adapted to receive the base extensions of the heating units and the outer surface of the tank is preferably heavily lagged by a layer of asbestos cement or other suitable insulation material 3. In the illustrated embodiment of the invention, the outer surface of the tank 1 is provided with the welded spikes 4 adapted to extend into the insulation 3 and hold it securely against displacement. The tank is provided with the peripheral flanges 5 for protecting the insulation. These flanges have rolled edges 27 which overhang the insulation and prevent the acid flux which covers the top of the solder bath from creeping between the surface of the tank and the insulation, causing the latter to drop off. A can conveyor 6 of suitable and known construction passes longitudinally over the tank 1 carrying with it a succession of can bodies 7 having the longitudinal seam 8. The cans are brought above the tank 1 for the purpose of having the seam 8 soldered. A roller 9 driven by the pulley 29 or in any other suitable manner carried by bearings 10 mounted in recesses 27 in the opposite ends of the tank dips into the body of solder in the tank and in the course of its rotation, the solder is lifted and wiped against the seam which it enters, distributing itself by capillarity. The roller must be sufficiently hot to transmit the proper heat to the seam to which the solder will adhere and at the correct temperature to cause the solder to stick to it and be lifted from the bath. This heat is imparted to the roller by conduction from the solder.

Where gas or oil burners form the source of heating the tank 1 it is not particularly difficult to keep the body of solder at such a temperature as to maintain the roller at proper soldering heat, but when electric heating elements are used the heating is of compartively local application so that it is difficult to keep the roller hot enough to heat the seam and at the same time lift the solder from the bath to the seam.

The present invention provides a plurality of heating units 11, 12 and 13, Figure 1, one of which is illustrated in Figure 3, said units consisting of open ended troughs arranged longitudinally of the bath and with reference to the line of cans, of such depth as to partly surround the roller 9. The heating units include the metal body 14 having a cylindrical boss extension 15 on its lower end, said boss fitting in the aperture 2 and the body surrounding the base of said boss constituting a shoulder 16 which rests upon the bottom of the tank. The boss extension is reduced to form a threaded tubular neck 17 upon which screws a nut 18 and lock nut 19. The nut 18 bears against the underside of the tank 1 and pulls the electrical heating unit down until the shoulder at 16 makes intimate contact with asbestos washers 28 at the body of the tank, producing a fluid-tight connection. The metal body 14 is cored out or otherwise hollow and contains the resistance elements 20. The resistance elements are connected to wires 21 and 22 which pass outwardly through the tubular boss extension and through a cap 23 which preferably closes the lower end of the neck 17. The wires 21 and 22 as shown in Figure 2 connect to a power line, a thermostat 24 intervening. The thermostat is placed in such position with regard to the solder to maintain the same within one or two degrees of the correct temperature.

Figure 1 shows that in the preferred form of the invention there are three electric heating elements to the tank 1 arranged in spaced relation, any one or more of which can be cut out at will. When soldering is not being done it is only necessary to keep a sufficient number of electric heating units alive to keep the solder from freezing. The conductivity of molten metals is such that heat applied at one point is quickly distributed and averaged over the whole mass of solder.

It will be observed from Figure 3 that the electrical heating element 11 is spaced from the walls of the tank 1 excepting of course at the bottom where it is supported by said walls. The electrical heating element 11 is therefore substantially immersed in the solder and there is no heat loss, all the heat being usefully employed in melting the solder. That which forms the most important feature of the invention is that the sides 25 and 26 of each heating element extend upwardly to a plane above the level of the lower side of the roller. In other words, the roller is immersed in the solder below the level of the top of the heater. By this arrangement of the parts, the body of solder within the bounds of the heater is heated to a more intense temperature than the general body of solder in the tank 1 the heat of the hotter part of the body of solder being quickly and uniformly transmitted to the general body of solder, but not so quickly as to prevent the roller 9 from being heated to a higher temperature than that of the general body of solder. This extra heat is directly communicated by the roller to the seam assuring perfect and reliable functioning of the soldering apparatus.

In order to remove or replace any unit, the solder in the bath is drained by suitable means, not shown, the nut 18 and lock nut 19 backed off and the unit lifted out of the tank. The replacement of the unit is equally simple.

While I have in the above disclosure described what I believe to be a preferred and practical embodiment of the invention, it will be understood to those skilled in the art that the details of construction and the arrangement of the parts as described are by way of example and not to be construed as limiting the scope of the appended claims.

What I claim is:

1. Apparatus for applying molten solder to the longitudinal seams of can bodies comprising in combination with a solder tank and a driven roller adapted to be partially submerged in the molten solder bath and to transfer heat and molten solder from the bath to the seam, a heating element submerged in the molten solder, extending on both sides of said roller to a level above the lowest level of submergence of said roller and being spaced from the wall of the tank, forming a solder chamber, whereby a body of solder less than the whole body of the bath, in contact with the roller and between the sides of said element, is heated to a higher temperature than the rest of the body of solder, the solder chamber of said heating element being in endwise communication with the whole body of the bath.

2. Apparatus for applying molten solder to the longitudinal seams of can bodies comprising in combination with a solder tank and a driven roller adapted to be partially submerged in the molten solder bath and to transfer heat and molten solder from the bath to the seam, an electric heating element submerged in the molten solder and extending on both sides of said roller to a level above the lowest level of submergence of said roller and being spaced from the wall of the tank, forming a solder chamber, whereby a body of solder less than the whole body of the bath, in contact with said roller and between the sides of said element, is heated to a higher temperature than the rest of the body of solder, the solder chamber of said element being in endwise communication with the whole body of the bath.

3. Apparatus for applying molten solder to the longitudinal seams of can bodies comprising in combination with a solder tank and a driven roller adapted to be partially submerged in the molten solder bath and to transfer heat and molten solder from the bath to the seam, a plurality of spaced heating elements submerged in said bath and longitudinally arranged beneath said roller, said heating elements extending on both sides of said roller to a level above the lowest point of submergence of said roller and being spaced from the wall of the tank, forming solder chambers, whereby a body of solder less than the whole body of the bath, in contact with said roller and between the sides of said elements, is heated to a higher temperature than the rest of the body of solder, the solder chambers of said heating elements being in endwise communication with the whole body of the bath.

4. Apparatus for applying molten solder to the longitudinal seams of can bodies, comprising in combination with a solder tank and a driven roller adapted to be partially submerged in the molten solder bath and to transfer heat and molten solder from the bath to the seam, a heating element submerged in the molten solder spaced from the wall of said tank and extending on both sides of said roller to a level above the lowest point of submergence of said roller, forming a solder chamber, whereby a body of solder less than the whole body of the bath, in contact with said roller and between the sides of said element, is heated to a higher temperature than the rest of the body of solder, the solder chamber of said heating element being in endwise communication with the whole body of the bath.

5. Apparatus for applying molten solder to the longitudinal seams of can bodies comprising in combination with a solder tank and a driven roller adapted to be partially submerged in the molten solder bath and to transfer heat and molten solder from the bath to the seam, a heating element submerged in the molten solder having a supporting boss fitting an aperture in the bottom of said tank and being detachably secured thereto, said heating element being spaced from the sides of said tank and having portions extending on both sides of said roller to a level above the lowest point of submergence of said roller, forming a solder chamber, whereby a body of solder less than the whole body of the bath, in contact with said roller and between the sides of said element, is heated to a higher temperature than the rest of the body of solder, the solder chamber of said heating element being in endwise communication with the whole body of the bath.

6. Apparatus for applying molten solder to the longitudinal seams of can bodies comprising in combination with a solder tank and a driven roller adapted to be partially submerged in the molten solder bath and to transfer heat and molten solder from the bath to the seam, an electric heating element submerged in the molten solder having a hollow supporting boss fitting in an aperture in the bottom of said tank and detachably secured thereto, and conductors from said element passing through said boss to the outside of said tank, said heating element being spaced from the sides of said tank and having portions extending on both sides of said roller to a level above the lowest point of submergence of said roller, forming a solder chamber, whereby a body of solder less than the whole body of the bath, in contact with the roller and between the sides of said element is heated to a higher temperature than the rest of the body of solder, the solder chamber of said heating element being in communication with the whole body of the bath.

WILLIAM F. WINTERLING.